UNITED STATES PATENT OFFICE.

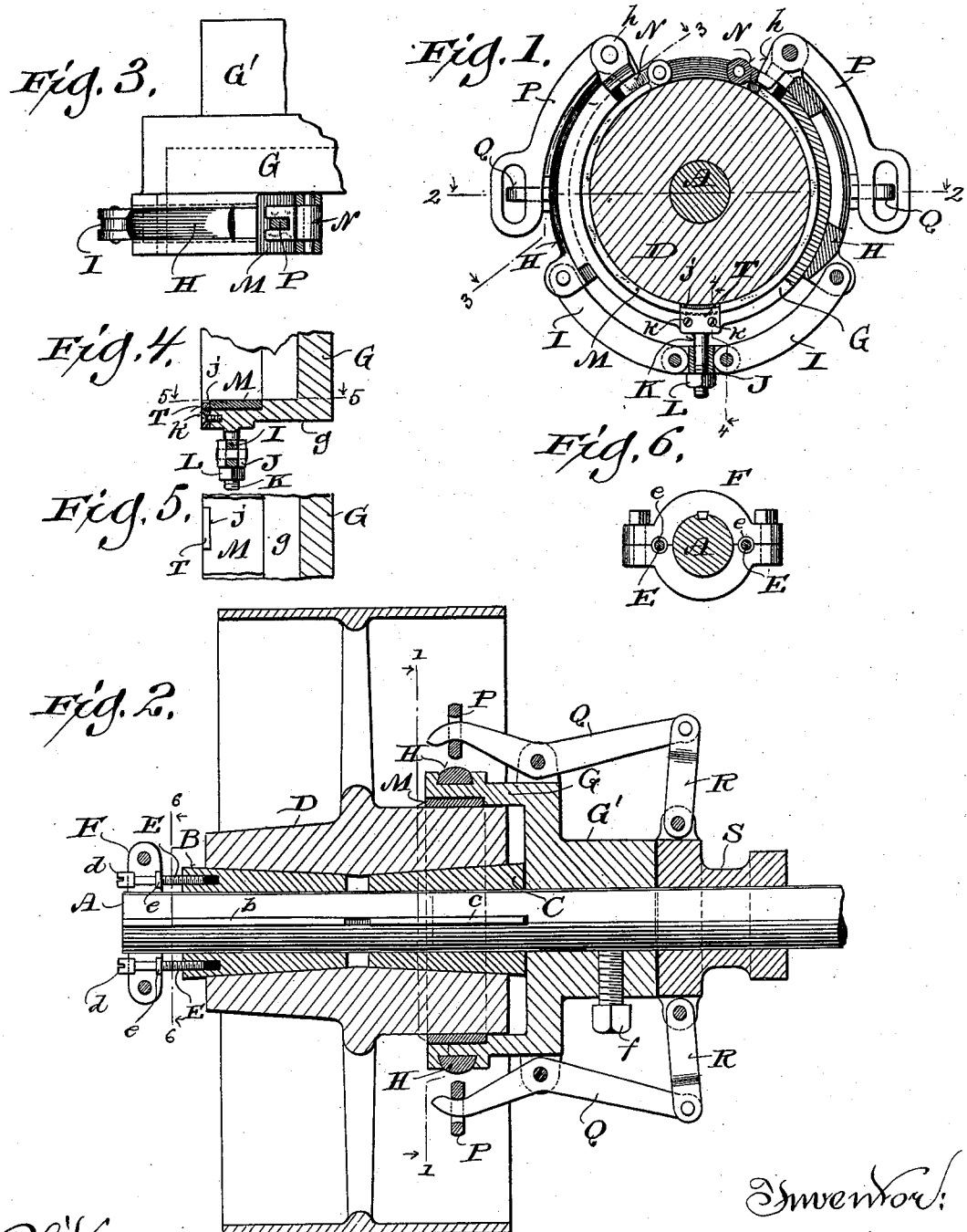

FERDINAND F. HOEHNE, OF KAUKAUNA, WISCONSIN, ASSIGNOR OF TWO-THIRDS TO THOMAS LONGWORTH, OF SAME PLACE, AND GILBERT F. GERMANSON, OF LITTLE CHUTE, WISCONSIN.

CLUTCH.

SPECIFICATION forming part of Letters Patent No. 568,348, dated September 29, 1896.

Application filed July 9, 1896. Serial No. 598,511. (No model.)

*To all whom it may concern:*

Be it known that I, FERDINAND F. HOEHNE, a citizen of the United States, and a resident of Kaukauna, in the county of Outagamie and State of Wisconsin, have invented certain new and useful Improvements in Friction-Clutches; and I do hereby declare that the following is a full, clear, and exact description thereof.

My invention has for its object to provide a simple, economical, and efficient friction-clutch, the same consisting in certain peculiarities of construction and combination of parts hereinafter set forth with reference to the accompanying drawings, and subsequently claimed.

In the drawings, Figure 1 represents a transverse section of my improved friction-clutch, the plane of the section being indicated by line 1 1 in Fig. 2; Fig. 2, a horizontal section, indicated by line 2 2 in Fig. 1; Fig. 3, a detail partly-sectional view, indicated by line 3 3 in Fig. 1; Fig. 4, a detail sectional view, indicated by line 4 4 in Fig. 1; Fig. 5, a detail partly-sectional view, indicated by line 5 5 in Fig. 4; and Fig. 6, a detail view, partly in transverse section, on line 6 6 of Fig. 2.

Referring by letter to the drawings, A represents a shaft provided with splines $b$ $c$ for cone-bushings B C, that engage the correspondingly-bored hub D of a belt-pulley or other rotary power-transmitting device, the small ends of these bushings being toward each other. The bushing B has its outer end provided with tapped recesses engaged by screws E, rotative in a collar F, keyed or otherwise rigidly secured on shaft A, this collar being preferably in two sections bolted together, as clearly illustrated in Fig. 6. The screws E are held in the collar F against longitudinal movement by any suitable means, as, for instance, their heads $d$ and beads $e$ engaging corresponding recesses in the collar-sections, as best illustrated in Fig. 2, and by rotation of said screws the bushing B is readily adjusted in a longitudinal direction to effect a crowding of pulley-hub D on both bushings to thereby compensate for wear. While it is essential that the bushing B shall be splined on shaft A, the one, C, may be keyed or otherwise rigidly secured to said shaft in order to rotate therewith.

Held fast on shaft A by a set-screw $f$ or other suitable means is the hub G' of a notched shell G, concentric with pulley-hub D, and provided with peripheral dovetail guides for slides H, that are connected by links I with a cross-head J, loose on a screw-threaded stem K, extended radially from said shell, and a set-nut L, adjustable on the stem against the cross-head, serves to effect a ready adjustment of said slides circumferentially of the aforesaid shell incident to the radial movement of said cross-head on said stem.

A split friction-band M inside the shell G has recessed extremities that play in the notch of said shell and have shackle connection with slotted blocks N, engaged by bell-cranks P, in pivotal connection with ears $h$ on the slides H, above specified, these bell-cranks being provided with slotted extremities engaged by levers Q, fulcrumed on the aforesaid shell and connected by links R with a sleeve S, loose on the shaft A longitudinally of the same for connection with an operating-lever.

In practice the sleeve S, moved toward hub D of the power-transmitting device, operates the links R to rock the levers Q in a direction that will cause bell-cranks P to exert leverage against blocks N to thereby contract the friction-band M and bring it tight on said hub to thus insure rotation of shaft A, the shackle-connection of said blocks and friction-band preventing the latter from having other than contractive movement under pressure of said bell-cranks. Adjustment of set-nut L against cross-head J and stem K causes the approach of links I toward concentricity with friction-band M, and as said links exert pressure on the slides H the latter are moved in their guides to effect contraction of said friction-band in order to compensate for wear.

The friction-band is shown provided with a recess $j$ midway of its extremities for engagement of a stay-plate T, held on the rim of shell G by screws $k$, and thus it will be seen that provision is made for preventing slip of said band in either direction circumferentially of hub D, with which it has frictional contact.

Having now fully described my invention, what I claim as new, and desire to secure by Letters Patent, is—

1. In a friction-clutch, the combination of a shaft, a pair of cone-bushings arranged on the shaft to rotate therewith and have their small ends toward each other, a power-transmitting device having a hub engaged by the bushings, screws engaging tapped openings in the outer end of one of said bushings, this bushing being loose longitudinally of said shaft, and suitable means for holding the screws against other than rotary movement.

2. In a friction-clutch, the combination of a shaft, a pair of cone-bushings splined on the shaft to have their small ends toward each other, a power-transmitting device having a hub engaged by the bushings, screws arranged to engage tapped openings in the outer end of one of said bushings, and suitable means for holding the screws against other than rotary movement.

3. In a friction-clutch, the combination of a shaft, a pair of cone-bushings arranged on the shaft to rotate therewith and have their small ends toward each other, a power-transmitting device having a hub engaged by the bushings, a collar fast on said shaft, and screws held against other than rotative movement in the collar but engaged with tapped openings in the outer end of one of said bushings, the latter being loose longitudinally of the aforesaid shaft.

4. In a friction-clutch, the combination of a shaft, a pair of cone-bushings arranged on the shaft to rotate therewith and have their small ends toward each other, a power-transmitting device having a hub engaged by the bushings, a two-section collar bolted on said shaft, and screws that having heads and beads rotative in collar-section recesses are engaged with tapped openings in the outer end of one of said bushings, the latter being loose longitudinally of the aforesaid shaft.

5. In a friction-clutch the combination of a shaft for connection with a shaft to have concentricity with the hub of a power-transmitting device, slides on the shell peripherally of the same, a hub-embracing split friction-band within said shell, bell-cranks carried by the slides and operative to exert push against the extremities of the friction-band, bell-crank-actuating levers fulcrumed on the aforesaid shell, and a sliding shaft-engaging sleeve in link connection with the levers.

6. In a friction-clutch, the combination of a shell for connection with a shaft to have concentricity with the hub of a power-transmitting device, slides on the shell peripherally of the same, a hub-embracing split friction-band within said shell, bell-cranks carried by the slides and operative to exert push against the extremities of the friction-band, suitable means for adjusting said slides circumferentially of said shell to compensate for wear intermediate of aforesaid hub and friction-band, bell-crank-actuating levers fulcrumed on the aforesaid shell and a sliding shaft-engaging sleeve in link connection with the levers.

7. In a friction-clutch, the combination of a shell for connection with a shaft to have concentricity with the hub of a power-transmitting device, slides on the shell peripherally of the same, a hub-embracing split friction-band within said shell, slotted blocks in shackle connection with the extremities of the friction-band, bell-cranks carried by the slides and engaged with the block-slots, bell-crank-actuating levers fulcrumed on the aforesaid shell, and a sliding shaft-engaging sleeve in link connection with the levers.

8. In a friction-clutch, the combination of a shell for connection with a shaft to have concentricity with the hub of a power-transmitting device, slides on the shell peripherally of the same, a hub-embracing split friction-band within said shell, a plate on the shell-rim engaging a corresponding recess in the friction-band, bell-cranks carried by the slides and operative to exert push against the extremities of said friction-band, bell-crank-actuating levers fulcrumed on the aforesaid shell, and a sliding shaft-engaging sleeve in link connection with the levers.

9. In a friction-clutch, the combination of a shell for connection with a shaft to have concentricity with the hub of a power-transmitting device, slides on the shell peripherally of the same, a split friction-band within said shell, bell-cranks carried by the slides and operative to exert push against the extremities of the friction-band, a screw-threaded stem extending radially from the aforesaid shell, a cross-head loose on the stem, a set-nut operative on said stem against the cross-head, and links connecting said cross-head and slides; bell-crank-actuating levers fulcrumed on the aforesaid shell, and a sliding shaft-engaging sleeve in link connection with the levers.

10. In a friction-clutch the combination of a shell for connection with a shaft to have concentricity with the hub of a power-transmitting device, a hub-embracing split friction-band centered in said shell, slides on the shell peripherally of the same, bell-cranks connected to the slides, blocks in shackle connection with the friction-band extremities and provided with slots engaged by the bell-cranks, bell-crank-actuating levers, a sliding shaft-engaging sleeve in link connection with the levers, and suitable means for adjusting the aforesaid slides independent of the sleeve action.

In testimony that I claim the foregoing I have hereunto set my hand, at Kaukauna, in the county of Outagamie and State of Wisconsin, in the presence of two witnesses.

FERDINAND F. HOEHNE.

Witnesses:
J. C. GARVEY,
C. H. L. HAMER.